Feb. 15, 1927.
B. M. BALCH
1,617,511
METHOD OF CUTTING SPONGE RUBBER
Filed April 7, 1926
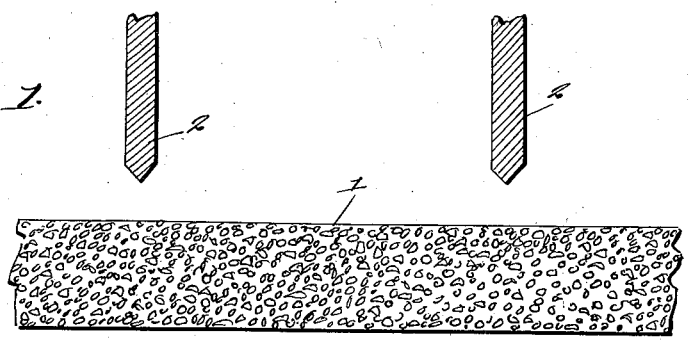
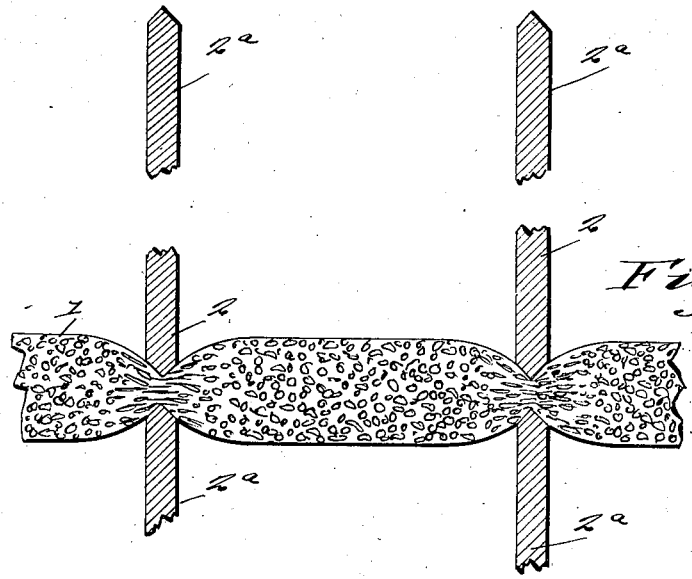
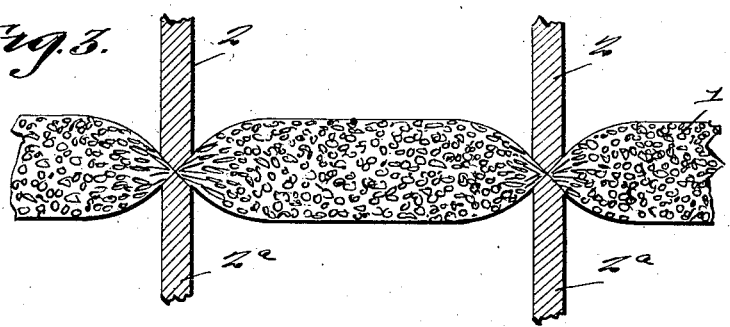
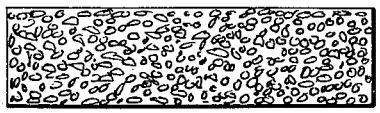
Inventor
Burdge M. Balch
By Spear Middleton Donaldson & Hall
Attorney Patented Feb. 15, 1927.

1,617,511

UNITED STATES PATENT OFFICE.

BURDGE M. BALCH, OF AKRON, OHIO, ASSIGNOR TO THE MILLER RUBBER COMPANY, OF AKRON, OHIO, A CORPORATION OF OHIO.

METHOD OF CUTTING SPONGE RUBBER.

Application filed April 7, 1926. Serial No. 100,396.

My present invention relates to an improved method or process of cutting sponge rubber sheets or slabs, such as are used for seat cushions and analogous purposes, either with or without a fabric facing such as felt which is commonly applied to the exposed side of the cushion.

Heretofore much difficulty has been experienced in cutting such slabs or sheets in a manner to secure perpendicular edges, due to the extreme compressibility of the material and its tendency to crowd to one side or bulge out before the knife begins its cutting operation.

My present invention aims to avoid this objection and provide a method by which such sheets or slabs may be rapidly cut and the edges of the severed articles will be absolutely true and perpendicular to the plane of the sheet, and the invention consists broadly in compressing the material equally from opposite sides along the entire length of the desired cut and severing it on the median line of the compressed portion and while so compressed.

In order that the invention may be better understood, reference is made to the accompanying drawing, in which:—

Figure 1 is a sectional view of a conventional nature, showing a sheet of sponge rubber and a pair of opposed cutting dies spaced therefrom.

Fig. 2 is a similar view showing the dies as having approached each other to compress the sheets.

Fig. 3 is a similar view showing the position of the dies at the completion of the cutting operation, and Fig. 4 is a sectional view of the finished article.

In this drawing the numeral 1 designates the sheet to be cut composed, as shown, of cellular or sponge rubber, the extremely compressible nature of which renders accurate cutting difficult irrespective of whether the sheet or slab is composed wholly of sponge rubber or is surfaced on one or both sides with textile material.

Heretofore such a rubber sheet has been usually cut by placing it on a support such as a wooden die block and subjecting it to the action of a thin sharp bladed cutting die, the result of which is to force the upper surface of the sheet downward for a considerable distance before the knife begins to penetrate the rubber. The extreme elasticity of the material tends either to deflect the cutting blade or die, or if this is incapable of deflection, for the material within the body of the sheet to be deflected laterally to one side of the line of cut.

I have discovered that such objections may be overcome by opposed cutting dies having relatively blunt cutting edges, as for example by having relatively thick blades with edges formed by plane faces which meet at an angle of say not less than 90°. When such cutting dies are brought together with the stock therebetween the first action is to compress the sheet from opposite sides for a material distance on each side of the cutting edges or apices of the cutters and along the entire length of the cut, and this compressing continues until the material is compressed to such an extent that the portion between the cutters is substantially solid or the cells collapsed.

Further movement of the cutters severs the stock on the median line of the compressed portion. The opposed cutters are indicated at 2 and 2ª, and may be of any desired configuration, corresponding to the desired shape of article.

I have shown the cutters in a conventional manner, as they may be mounted in any desired form of supporting and operating mechanism.

In Fig. 1 I have shown their relation to the sheet before starting the cutting, while in Fig. 2 the dies are shown as having compressed the sheet until it is substantially solid.

Fig. 3 shows the cutters as having severed the sheet on the median line of the compressed portion.

Having thus described my invention, what I claim is:—

1. The process of cutting a slab which includes spongy material in its composition, which consists in compressing the slab by blunt edged cutting knives equally from opposite sides along the desired line of cut until it is substantially solid, and severing it while so compressed by bringing the blunt edges together.

2. The process of cutting a slab of spongy material which consists in compressing it equally from opposite sides along the entire length of the line of desired cut, and severing it when so compressed by the simultaneous action of aligned dies having blunt cutting edges which come together in the cutting operation.

In testimony whereof, I affix my signature.

BURDGE M. BALCH.